United States Patent [19]
McFarlane

[11] 3,843,300
[45] Oct. 22, 1974

[54] TIP FORMING MACHINE AND PROCESS
[76] Inventor: Richard H. McFarlane, 2571 Kaneville Rd., Geneva, Ill. 60134
[22] Filed: Sept. 26, 1973
[21] Appl. No.: 401,052

[52] U.S. Cl. ............................... 425/384, 264/322
[51] Int. Cl. ............................................. B29h 3/00
[58] Field of Search ........... 425/384, 383, 392, 406, 425/407, 410, 76; 264/322

[56] References Cited
UNITED STATES PATENTS
3,237,243  3/1966  Saumsiegle et al. ................ 425/384
3,509,252  5/1970  Baehr............................. 264/322 X
3,755,528  8/1970  Gutlhuber et al................... 264/322

Primary Examiner—Roy Lake
Assistant Examiner—DeWalden W. Jones

[57] ABSTRACT

A machine and process for forming a tip on a tube which includes holding means for the end of the tube and a die forming member with a recess movable into and out of die forming relation of the jaw and heat means to heat a tube extending from the jaw to form a tip when in the recess of the die.

9 Claims, 5 Drawing Figures

PATENTED OCT 22 1974 3,843,300
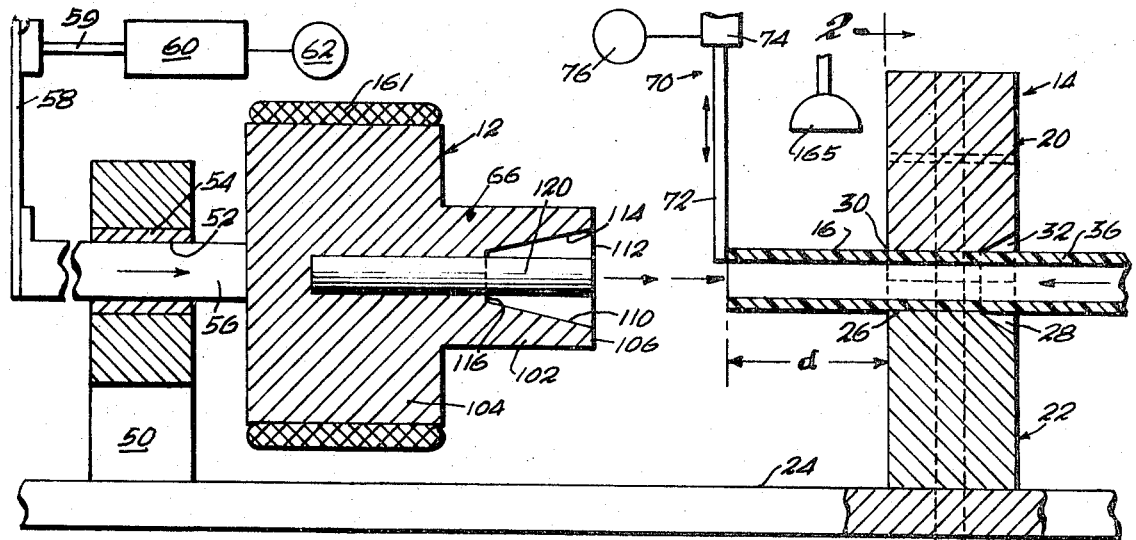
Fig. 1
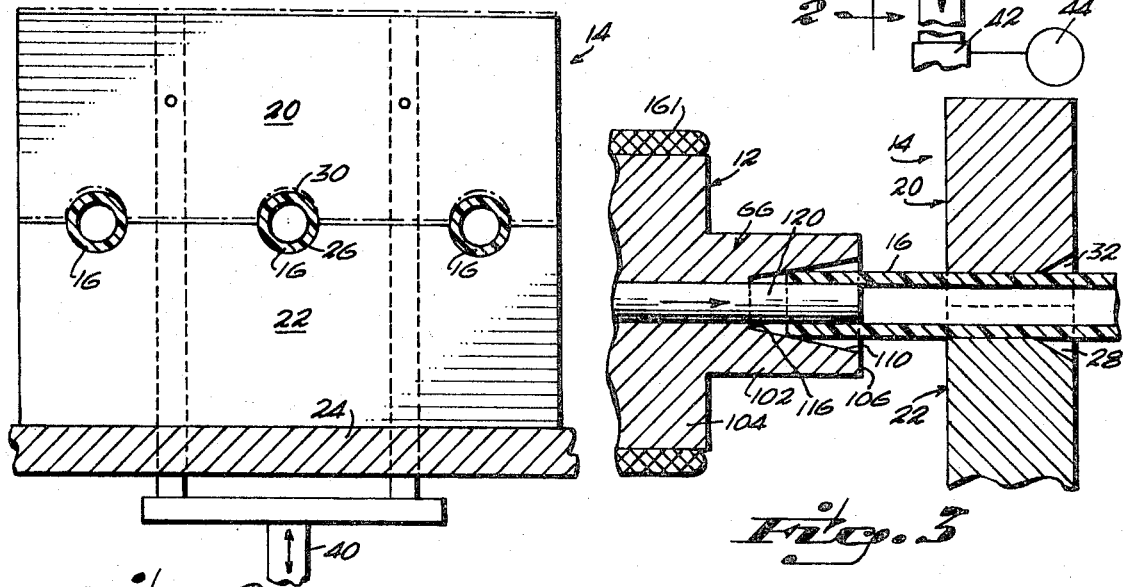
Fig. 2
Fig. 3
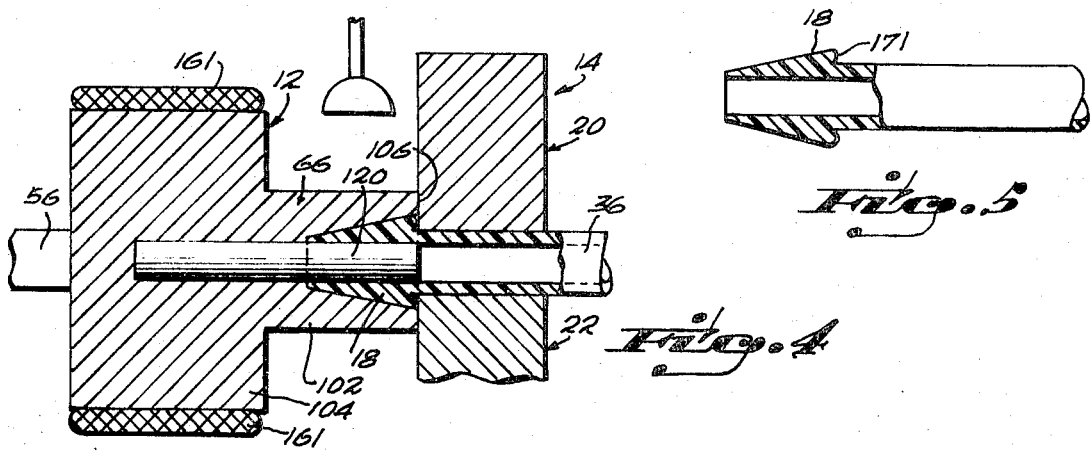
Fig. 4
Fig. 5

TIP FORMING MACHINE AND PROCESS

FIELD OF THE INVENTION

This invention relates to a machine for forming a tip on a surgical tube which is integral and securely fixed thereto.

BACKGROUND OF THE INVENTION

In the surgical field, it is, from time to time, necessary to insert the end of a tube into an artery, duct, vein or the like. Quite often this is a relatively dangerous operation because tips on the end of tubes can become free and obstruct the column or lumen with attendant damage in removing it and risk to the patient. This invention is of a tube, commonly of plastic, which has an integral tip on the terminal end which is securely in place so that the danger of it becoming loose is obviated and of a machine and process for making a tubular length with a tipped end.

OBJECTS OF THE INVENTION

It is an object of this invention to provide a tip forming machine for tubular stock of predetermined wall thickness and of meltable formable material which includes a jaw which can be opened or closed and which is effective to hold the end of a tube so that the distal end can be formed with an integral tip by a die, the machine being of the type described hereinafter.

It is another object of this invention to provide an improved process for forming a tip on the end of a tube of meltable formable material and, additionally, a product of the process, comprising a tubular length having an integral tip on one end thereof.

In accordance with these and other objects which will become apparent hereinafter, the instant invention will now be described with reference to the accompanying drawings in which:

DESCRIPTION OF THE DRAWINGS

FIG. 1 is a partial view which illustrates a machine according to this invention and which is partially in cross section;

FIG. 2 is a view in cross section taken on the plane indicated by the line 2—2 of FIG. 1 and looking in the direction of the arrows;

FIG. 3 is a partial view of the machine components as described hereinafter in a position initiating the forming operation of the machine; and FIG. 4 is a view in cross section similar to FIG. 4 and illustrating the machine of FIG. 1 in a position at which the forming process is being completed; and FIG. 5 is a view, which is partially in cross section, and which illustrates the product of the machine and process described hereinafter.

DESCRIPTION OF THE PREFERRED EMBODIMENT

Referring to the drawings wherein like reference characters designate like or corresponding parts throughout the several views and referring particularly to FIG. 1, the machine is seen to include a die forming member or tool 12 movable into and out of close confronting relation with a jaw 14 to form the distal end length 16 of a tube into a tip 18, see FIG. 5.

Referring specifically to the jaw 14, it is seen to include an upper, movable jaw member 20 and a lower jaw member 22. The lower jaw member 22 is in a fixed position with respect to a frame 24 of the machine and includes a recess 26 having an entrance mouth 28. The movable jaw 20 is also supported on the frame and is provided with a recess 30 having an entrance mouth 32. The jaw members are movable between an open position and a closed position. When in a closed position the recesses cooperate to define a tube passageway sized to grip the outside diameter of the end zone 36 of a tubular length. The means to move the movable jaw member comprise a piston 40 movable with respect to a cylinder 42 by an energy source such as that designated by the numeral 44. The degree of movement, as shown by the dot-dash lines of FIG. 2 may be relatively slight.

The die includes a guide means 50 mounted on the frame 24 having a through passageway 52 provided with bearing means 54 for sliding axial movement of a shaft 56 upon actuation by a piston extension 58 of piston 59 which engages in the cylinder 60 to be actuated by suitable means such as that indicated by the numeral 62 and effective to advance or retract the die forming portion of the tool designated by the numeral 66 into an advanced or retracted position as shown in FIGS. 4 and 3, respectively.

Stop means, generally designated by the numeral 70 are provided and in the preferred embodiment comprise a pin included on a piston rod 72 which is movable with respect to a cylinder 74 upon actuation by a suitable source such as that indicated by the numeral 76 to move the pin into and out of an obstructing position in the axial projection of the passageway defined by the jaws when in a closed position. The stop means serves to limit the position of the end of the tube which is passed through the passageway and the tube being uniform also serves to determine the volume of flowable meltable material of which the tube is composed which is available to be deformed in the process.

Referring more specifically to the die, it includes a leading portion 102 and a trailing portion 104 which are integral, the leading portion being of a somewhat smaller diameter than the trailing portion. The face 106 of the leading portion is provided with a forming recess 110 which is generally conical having a mouth 112 and being bounded by a side wall 114 and end wall 116, the side wall of the recess converging depthwise from the mouth to the end wall which is of a diameter less than the outside diameter of the tube and with the mouth being of a diameter greater than the outside diameter of the tube. Additionally, a pin 120 which is symmetrical extends axially from the end wall which is coaxial with the passageway of the jaws and the center pin is of an axial length which extends toward and, preferably, substantially to the plane of said mouth, the pin being of a lateral cross section sized to closely fit within the column of the end zone of the tube and, preferably, is of a length at least sufficient so that when the face of the leading portion of the die is in close confronting relation with the jaw the pin will be received within the column of the tube prior to the time the portion of the tube at the terminal end will engage the converging wall of the recess. Means are provided about the die to heat it so as to deform the meltable material of the tube, the means being designated by the numeral 161 and comprising a heating coil peripherally arranged thereabout. In the preferred embodiment a cooling means is provided closely adjacent the stop means and intermediate it and the jaw, the cooling means being designated by the numeral 165 and being adapted to cool the portion of the die about the end of the tube when in the position shown in FIG. 4.

In operation, the end of the tube is positioned in the passageway of the jaw and the jaws are then closed so that the end zone is tightly gripped and a distal end portion or length extends axially therefrom to a stop means which limits penetration of the end of the tube and which stop means preferably comprises a pin which obstructs the path and is removable therefrom. Upon being positioned, the tip of the tube is then formed by the die. The die is advanced toward the tube with the conical recess being coaxial therewith. The die is simultaneously heated and the heat is of a temperature such that the meltable material of the tube is rendered formable and as the die advances the tip of the tube is formed, the die being advanced until there is a volume of the material in the recess which is substantially equal to the volume of the recess. Thereafter, the coolant is applied from the cooling means which causes some shrinkage of the material in the recess and, the die is removed which yields an integral tip on the end of the tube as seen in FIG. 5, which has rounded or curved ends as indicated at 171.

In a preferred embodiment multiple passageways may be provided in the jaws and multiple recesses in the die machine, as indicated in FIG. 2. It is thus seen that there has been provided a simple, novel and highly effective machine and process for providing a plastic or meltable tube with a tip on the terminal end thereof which tip is characterized by a rounded shoulder at the inner end of the tip which is relatively smooth in passage into and out of a duct, artery or vein in the human body.

What is claimed is:

1. A tip forming machine for tubular stock of predetermined wall thickness and of meltable formable material, said machine comprising, a frame, a positioning jaw for holding the end zone of a tube to be formed with a terminal tip on one end thereof, and including, a fixed jaw member on the frame, said fixed jaw member having a first through recess, a movable jaw member on the frame having a second through recess companionate to said first recess, means to move the jaw members between a) a partially open position and b) a closed position, said recesses of said jaw members, when in said closed position, defining a through passageway sized for snug tight gripping engagement of the end zone of the tube with the terminal end of said tube extending from said passageway;

stop means to limit axial penetration of the end zone of the tube through said passageway when the jaws are in an open position and effective to measure a predetermined distal end length of the tube extending from said jaw which is characterized by a predetermined volume of said material, a forming die movable between a first retracted position spaced from said jaw and a second advanced position closely adjacent to said jaw, said die having a face confronting said jaw and a conical forming recess in said face, said recess having a mouth and being bounded by a side wall and end wall, said side wall of said recess converging depthwise from said mouth to said end wall and said end wall being of a diameter less than the outside diameter of said tube and said mouth being of a diameter greater than the outside diameter of said tube, said forming die having a symmetrical center pin extending axially from said end wall the axial length of said recess to the plane of said mouth and of a lateral cross section sized to closely fit within the column of said distal end length when said forming die is moved to said advanced position, means to heat said forming die to a temperature above the temperature of said meltable formable material sufficient to heat the predetermined volume of the distal end length and deform said end length into a conical tip with a through passageway integral on the end of said tube; and means to move said die between said advanced and retracted positions with said recess being coaxial with said passageway when in an advanced position.

2. The machine as set forth in claim 1 wherein the pin is sized such that the space in said recess between the side wall of said recess and said pin is of a volume less than and almost equal to the predetermined volume.

3. The machine as set forth in claim 1 wherein the face of the die is in abutting relation with said jaw when in the advanced position.

4. The machine as set forth in claim 1 wherein cooling means are provided to cool the die when in the advanced position.

5. The machine as set forth in claim 1 wherein the die includes a leading portion and a trailing portion, said portions being integral, and said trailing portion including a heat means peripherally carried thereon.

6. The machine as set forth in claim 1 wherein said stop means comprises a member obstructing the axial path of said passageway and means to move the member into and out of said position of obstruction.

7. The machine as set forth in claim 1 wherein said means to move the movable jaw members comprises piston and cylinder means.

8. The machine as set forth in claim 1 wherein said means to move the die comprises cylinder and piston means.

9. The machine as set forth in claim 7 wherein said means to move the die comprises cylinder and piston means.

* * * * *